United States Patent [19]

Reitz

[11] 4,179,627

[45] Dec. 18, 1979

[54] ELECTRICAL APPARATUS

[75] Inventor: Ronald P. Reitz, Annapolis, Md.

[73] Assignee: Tom Swift Enterprises, Inc., Annapolis, Md.

[21] Appl. No.: 884,396

[22] Filed: Mar. 8, 1978

Related U.S. Application Data

[63] Continuation-in-part of Ser. No. 805,399, Jun. 10, 1977, Pat. No. 4,126,149.

[51] Int. Cl.² .............................................. H01L 31/04
[52] U.S. Cl. ................... 307/261; 250/211R; 250/531; 313/94; 313/96; 313/99; 328/28; 333/185; 334/14; 361/281; 365/102; 136/89 SP
[58] Field of Search .................. 136/89 AA, 89 TF; 313/94, 99, 96; 361/277–279, 281; 365/102, 149; 250/531, 211 R, 213 R; 334/14; 333/705; 328/28; 307/261

[56] References Cited

U.S. PATENT DOCUMENTS

| | | | |
|---|---|---|---|
| 2,463,632 | 3/1949 | Labin et al. | 315/58 |
| 3,058,022 | 10/1962 | Coleman | 313/96 |
| 3,121,648 | 2/1964 | Jensen | 136/89 |
| 3,218,196 | 11/1965 | Jensen et al. | 136/89 |
| 3,500,101 | 3/1970 | Burns | 250/213 R |
| 3,678,378 | 7/1972 | Trott et al. | 324/61 R |
| 3,971,938 | 7/1976 | O'Hare | 250/336 |
| 4,021,788 | 5/1977 | Marr | 365/149 |
| 4,058,729 | 11/1977 | Sher | 250/370 |

*Primary Examiner*—Aaron Weisstuch
*Attorney, Agent, or Firm*—Schwartz, Jeffery, Schwaab, Mack, Blumenthal & Koch

[57] ABSTRACT

An electrical apparatus for use as a capacitor, solar cell, switching device, wave-shaper and the like. The apparatus comprises a first electrode, a first dielectric positioned proximate one side of the first electrode, a second electrode positioned proximate the first dielectric, a second dielectric positioned proximate one side of the second electrode, a third electrode positioned proximate the second dielectric and generally facing said one side of the second electrode, a third dielectric positioned proximate the non-facing side of the third electrode, a fourth electrode positioned proximate the third dielectric, means for connecting the first and fourth electrodes to a control circuit whereby an electrical potential is established between the first and fourth electrodes, and means for connecting the second and third electrodes to an external circuit whereby upon operation of the external circuit the second and third electrodes are connected in circuit.

26 Claims, 13 Drawing Figures

ELECTRICAL APPARATUS

CROSS REFERENCE

This application is a continuation-in-part of Ser. No. 805,399, now U.S. Pat. No. 4,126,149, filed June 10, 1977, incorporated herein by reference.

BACKGROUND OF THE INVENTION

1. Field of the Invention

The invention is in the field of energy conversion and/or storage and relates to a device which can be variously used as a solar energy converter, capacitor, photoamplifier, a photomultiplier, a synchronizer, a switching device, a photodetector, electromagnetic radiation measuring device, an ion plasma device and a computer memory unit.

2. Description of the Invention

In earlier filed Patent Application Ser. No. 805,399 which has been incorporated herein by reference, a unit has been described for use specifically as a means for converting solar energy into electrical energy. In that particular application, reference was made to solar energy conversion systems which, upon exposure to solar radiation, produce electron-hole pairs and a corresponding electrical current when a potential is applied across semi-conductor surfaces. Examples of such prior art are U.S. Pat. Nos. 2,736,848, 2,981,777 and 2,949,498. Alternate prior art devices such as U.S. Pat. No. 3,058,022, employ photo-emissive surfaces which, upon exposure to incident solar radiation, liberate electrons by means of a photoelectric effect. Typically, the liberated electrons are collected through a vacuum surface on a collecting surface, and the potential produced between the emitting and collecting surfaces form a voltage source which may be utilized for driving a load. Examples of such teachings are shown in U.S. Pat. Nos. 3,121,648 and 3,218,196. A similar technique utilizes thermally liberated electrons from an emitting surface upon exposure to incident solar radiation. The thermally liberated electrons are collected on a collecting plate and utilized to drive a load. U.S. Pat. No. 3,026,439 is an example of such a thermal energy converter. Various other solar energy devices employing various methods have been disclosed; however, the above are generally typical.

Prior art capacitors normally use a dielectric material placed between two electrodes which are oppositely charged. The opposite charge may be derived from either alternating or direct current sources. The dielectric material may be of various material; for example, U.S. Pat. No. 3,562,425 illustrates a semi-conductor material placed between two electrodes and charges form within the dielectric when it is exposed to light.

U.S. Pat. No. 2,193,710 illustrates prior art sealed, gas-filled capacitors. An example of prior art devices which illustrate capacitance changes when electromagnetic radiation reacts with the dielectric material is illustrated in U.S. Pat. No. 3,971,938.

Prior art thermal amplifiers and photoamplifiers include devices wherein a cathode surface emits electrons upon being excited by thermal energy or photon energy striking the cathode surface. The electrons are then collected on an anode which is spaced from the cathode material. The amplification is controlled by the amount of thermal energy which is generated in the cathode or the amount of light which strikes the cathode surface. Often, there is found, as in the case of triodes and pentodes, various numbers of grids which are placed between the cathode and anode and which are charged either positively or negatively to control the current flow of electrons from the cathode to the collector plate. These control devices are used to also amplify the amount of electrons which strike the collector plate and amplify signals which are placed on the various grids or plates spaced between the collectors and cathodes. There are also photocathode units which function as photodetector devices. These photodetector units are similar to that illustrated in U.S. Pat. No. 3,310,701 which includes a semiconductor material and light transmissive insulator having another semiconductor material, a vacuum and an anode. In this particular device, the light activates the electrons on both semiconductive surfaces, and an opposite E-field is established between the semiconductor plates. The opposite E-field helps to increase the work function of the electron emissive semiconductor materials. The electrons which are emitted are transmitted through a vacuum and strike an anode surface. A similar approach is found in U.S. Pat. No. 3,814,993.

There are very few prior art devices which standardize the use of ion plasmas. Ion plasmas can be found in normal photocathode materials and normal thermal amplifiers and photoamplifiers publicly available. These ion plasmas take the form of charges on an electrically conductive surface. The electrically conductive surface may either be a controlling grid which is placed between the photocathode and the anode or may actually be connected to the anode or cathode to control the amount of charge which is placed on the photocathode or on the anode and spaced therefrom.

There are test methods for testing photocathodes. Such a test method is similar to that shown in U.S. Pat. No. 1,466,701 wherein the light strikes a photosensitive material, and the turning on and off of the light allows one to test the efficiency of the photocathode. Another method for detecting the amount of light which strikes the surface of a detector is in the form of a radiation thermometer as illustrated in U.S. Pat. No. 3,161,775.

Current state of the art memory units for use in computers and calculators are illustrated, for example, in U.S. Pat. Nos. 3,235,850 and 3,601,610, and as well as in selenium trapping memory unit illustrated in U.S. Pat. No. 3,407,394. The memory units currently employed can be built of either semiconductive material as in the prior patent or in non-semiconductive material but light transmissive material as referred to in the latter patent.

It is an object of the instant invention to provide a method and apparatus for converting solar energy into electrical energy as discussed in Application Ser. No. 805,399.

Another object is to provide a method and apparatus wherein photoelectrons are liberated from an electron emissive surface and collected in a capacitive type storage apparatus for generating a relatively large amount of electric current to be utilized with a load.

Another object of the invention is to provide a capacitor storage means whereby the electrodes of the device act as plates in the capacitor and are capable of storing charges greater than that able to be charged in present state of the art devices.

Yet another object of the invention is to provide a capacitor wherein the capacitance may be varied in relation to an applied voltage potential and produce a wide dynamic range of capacitance values.

A further object of the invention is to provide a capacitor storage means whereby the capacitance is variable via a solid state means or electric means rather than manual tuning.

A still further object of the invention is to provide a capacitor storage means wherein the current leakage of the capacitor is controllable and variable.

Another object of the invention is to provide a device which will amplify a signal resulting from a light or thermal source.

Still another object of the invention is to provide a synchronizer or a switching device which, upon the collection of a certain amount of electrons on a collector anode, will by means of a sensing apparatus between the collector and an electrode, cause a discharge of either the interior or exterior plates.

A further object of the invention is to standardize ion plasmas and allow ion plasmas to be used in relatively inexpensive devices.

Another object of the invention is to provide a method for testing photocathodes wherein a solid state test method is desirable. Still another object of the invention is to provide a device for use as a memory unit wherein the charge is stored on interior plates in a capacitive-type storage unit.

BRIEF DESCRIPTION OF THE DRAWINGS

FIGS. 5 and 5A are schematic cross sections of a solar cell embodiment of the invention;

DETAILED DESCRIPTION OF THE INVENTION

Figure 1:
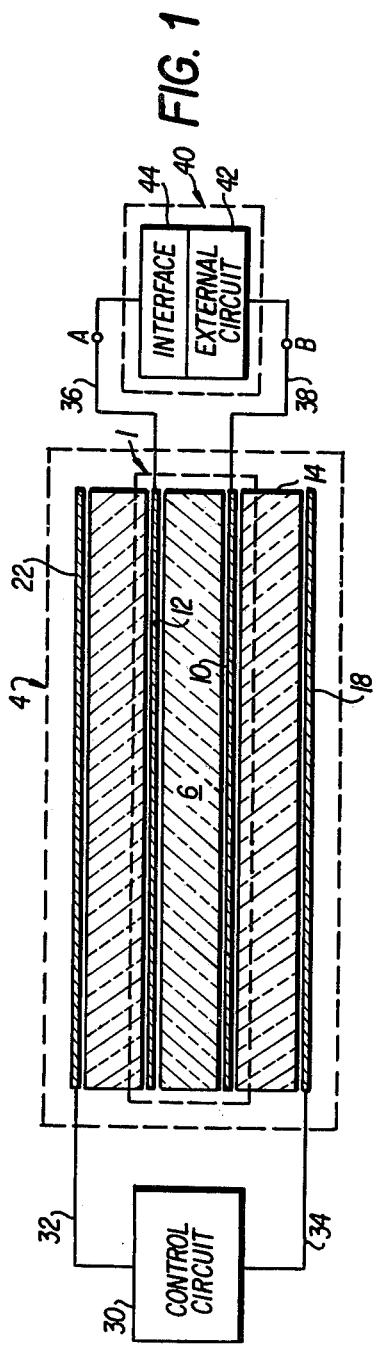
FIG. 1 is a block schematic diagram of an embodiment of the invention utilized as a capacitor.

FIG. 1 illustrates a schematic diagram of the capacitor in accordance with the principles of the invention. Capacitor 1 comprises a plurality of electrode surfaces and dielectric means positioned therebetween. The electrodes and dielectric means are secured to one another generally within a housing to form a capacitive device indicated at 4. A first and second inner electrode are indicated at 10 and 12 respectively, and a first and second outer electrode are indicated at 18 and 22 respectively. Positioned between the inner electrodes 10 and 12 is dielectric means 6. Additionally, dielectric means 14 is positioned between inner electrode 10 and outer electrode 18 whereas dielectric means 20 is positioned between inner electrode 12 and outer electrode 22. Typically, there is no spacing between the dielectric means and electrodes and the spacing illustrated in FIG. 1 is for clarity of illustration.

Outer electrodes 18 and 22 are shown connected to a control circuit 30 by means of conductors 32 and 34. Control circuit 30 is utilized to variably control the potential $V_e$ applied between the first outer electrode 18 and the second outer electrode 22. Inner electrodes 10 and 12 are shown connected by means of conductors 36 and 38 to apparatus 40 which typically may be any device in which the capacitor 1 is desired to be utilized, e.g. radio, television, electronic detection/measurement equipment, ignition system for an automobile etc. Apparatus 40 typically comprises an external circuit 42 and an interface 44. External circuit 42 is typically the unmodified circuitry within the apparatus 40 to which it is desired to interconnect the capacitor 1. Interface 44 may or may not be utilized depending upon the particular external circuitry 42 and the application to which the capacitor is utilized. The function of interface 44 is to provide any needed modification to the external circuitry 44 so that capacitor 1 is compatible therewith. In effect, interface 44 is utilized to establish a potential $V_i$ between points A and B shown in FIG. 1. The potential $V_i$ is applied to the inner electrodes 10 and 12 and, together with the potential $V_e$ on the outer electrodes 18 and 22, is utilized to control the value of the capacitance of capacitor 1. Thus, interface 44 may typically comprise resistive or resistive/capacitive networks to control the magnitude of the potential $V_i$ as well as the rise time and fall time of the waveform.

Dielectric means 6, 14 and 20 may comprise the same or different materials depending upon the particular application utilized. For applications in which a large capacitive effect is desired, dielectric means 6, 14 and 20 would comprise materials having a high dielectric strength such as, for example, glass, ceramics, silicons, paper materials, hard rubber and the like. The selection of the material utilized will ultimately place a limit upon the value of charge capacitor 1 is able to hold. However, because of the unique arrangement of the electrodes and dielectric means, the overall capacitance of capacitor 1 is significantly greater than that available in conventional designs. Typically, the effective dielectric coefficient is much larger than that for conventional capacitors.

In accordance with the principles of the invention, the capacitor 1 is able to retain a larger amount of charge on the inner electrodes 10 and 12 because of a cancellation effect resulting from the application of opposite polarity charges deposited on outer electrodes 18 and 22. Particularly, by controlling the waveform $V_e$ applied to the outer electrode 18 and 22, one may control the value of capacitance 1 to vary in a predetermined manner. To illustrate the operation of the device one can utilize the formulas for parallel plate capacitors in conjunction with the illustration of FIG. 2.

Figure 2:
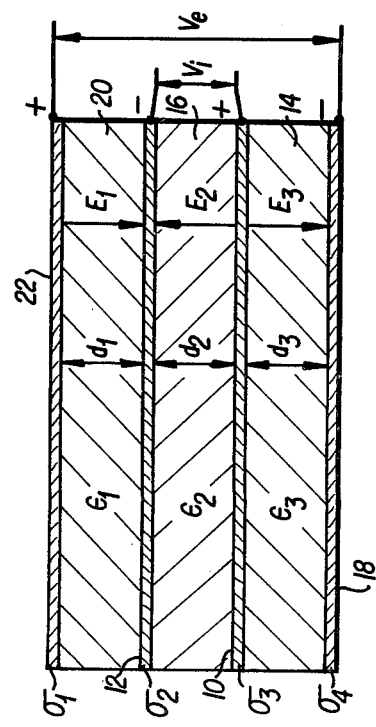
FIG. 2 is a schematic diagram of the basic electrodes and dielectric means forming the invention as utilized as a capacitor.

The illustration of FIG. 2 has been simplified to show the structural features of the capacitor including the inner electrodes 10 and 12 and outer electrodes 18 and 22. Dielectric means 20, 6 and 14 are shown to have a thickness $d_1$, $d_2$ and $d_3$, respectively. Additionally, the dielectric coefficients within the dielectric means 20, 6 and 14 have values $\epsilon_1$, $\epsilon_2$ and $\epsilon_3$. Typically, the potential $V_e$ between outer electrodes 18 and 22 is of opposite polarity from the internal electrode potential $V_i$ applied between inner electrodes 10 and 12. In effect then, opposite charges are applied between each of the adjacent electrodes 22, 12, 10 and 18. The resulting electrical field E within the region of dielectric means 20, 6 and 14 is then given by $E_1$, $E_2$ and $E_3$, respectively. Similarly, the charge density $\sigma$ on electrodes 22, 12, 10 and 18 is given respectively by $\sigma_1$, $\sigma_2$, $\sigma_3$ and $\sigma_4$. The effective capacitance of capacitor 1 is the capacitance between inner electrodes 10 and 12 and is given by $$C = Q/V \tag{1}$$

The potential V is the internal potential $V_i$ across electrodes 18 and 22 and is given in terms of the electric field as follows:

$$V_i = E_1 d_1 + E_2 d_2 + E_3 d_3 \tag{2}$$

The electric field for parallel plate capacitors is given by $E = \sigma/\epsilon$. Assuming that $d_1 = d_2$, $\sigma_1 = \sigma_4$, $\sigma_2 = \sigma_3$ and $\epsilon_1 = \epsilon_3$, one may write $$C = \sigma_1 A \left[ \frac{2\sigma_1 d_1}{\epsilon_1} + \frac{\sigma_1 - \sigma_2}{\epsilon_2} d_2 \right] \tag{3}$$

One may now define the external potential $V_e$ in terms of the charge of the interior plates as follows:

$$V_e = \frac{\sigma_1 d_1}{\epsilon_1} + \frac{\sigma_3 d_3}{\epsilon_3} \tag{4}$$

The interior potential may also be written in terms of the charge on the interior plates and the exterior potential as follows:

$$V_i = \sigma_2 \left( \frac{d_2}{\epsilon_2} \right) - V_e \tag{5}$$

It can then be shown that by eliminating $\sigma_1$ and $\sigma_2$ from equation (3) that the capacitance varies in accordance with the external and internal potentials in the following manner:

$$C = A / \left[ \left( \frac{2d_1}{\epsilon_1} + \frac{d_2}{\epsilon_2} \right) \left( 1 - \frac{1}{1 + \frac{V_e}{V_i}} \right) \right] \tag{6}$$

In equation (6) the potentials V and $V_i$ are the absolute values of these potentials inasmuch as the formula is derived for opposite polarities. From equation (6) it may thus be seen that the capacitance of capacitor 1 varies as a function of the ratio of $V_e/V_i$. Thus, by controlling the potentials applied to the interior and exterior plates one can variably control the capacitance reactance of capacitor 1.

Figure 3:
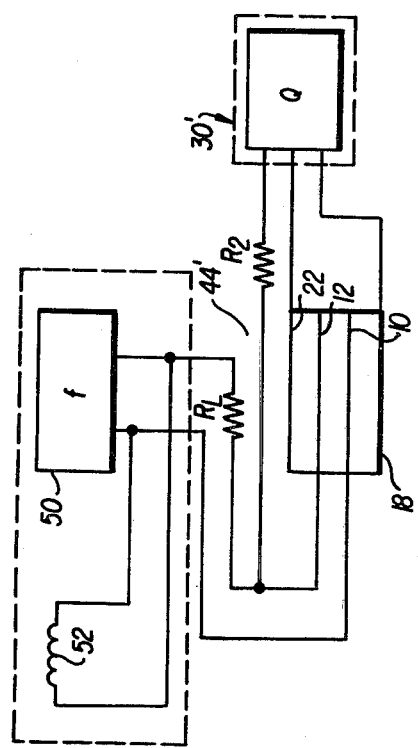
FIG. 3 is a block schematic diagram of the invention wherein the capacitor in accordance with the invention is utilized as a tuner.

With reference to FIG. 1, the control circuit 30 may typically be an oscillator sychronized with an oscillating circuit within external circuit 42 with which the capacitor is to be employed. Alternately, a simple arrangement is illustrated in FIG. 3 wherein the external circuitry 42' comprises, inter alia, a function generator 50 which may be simply a sine wave generator. The control circuitry 30 is simply a phase shift network (180° shift) indicated generally at 30'. The interface means may simply be a voltage dividing network comprising resistors $R_1$ and $R_2$ represented at 44'. Typically, the function generator 50 may be part of additional circuitry which utilizes the capacitive reactance of capacitor 1. A typical example may be a tank circuit, the presence of which is indicated at 52 within the external circuit 42'. The tank circuit in turn may be utilized by yet additional circuitry within the apparatus 40. In this fashion, the capacitor 1 is utilized in a type of tuning circuit.

A particular advantage of the capacitor in many applications is to obtain a rather large value of capacitive change for a rather small value of change in potential $V_e$. Consequently, one can produce a rather large dynamic range for the capacitance utilized in the external circuitry merely by controlling the voltage amplitude $V_e$. Additionally, the capacitance of capacitor 1 may vary quite rapidly in response to changes in $V_e$. For an effective constant $V_i$, as for example supplied by a constant voltage source, the waveform of the capacitance as a function of time follows the waveform of the externally applied voltage $V_e$. Thus, one may have a sinusoidal variation of capacitance over a relatively wide dynamic range by merely applying relatively small sinusoidal voltage between the external electrodes.

Figure 4:
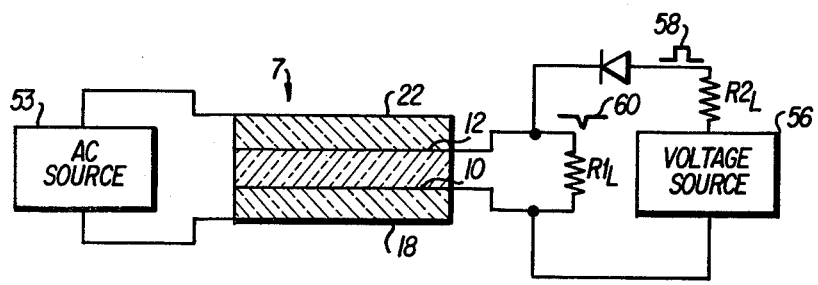
FIG. 4 is a block schematic diagram of the invention wherein the capacitor in accordance with the invention is utilized as a wave shaper/generator.

Yet another application of the capacitor 1 is illustrated in FIG. 4. As shown in FIG. 4, the capacitor 1 has its external electrodes 18 and 22 connected to an AC power source for providing a sinusoidal waveform thereto. The internal electrodes 10 and 12 are connected to a load resistance $R1_1$ and through a diode 54 and second load resistance $R2_1$ to a voltage source 56. The apparatus of FIG. 4 may be utilized to provide a square waveform as illustrated at 58 through the load resistance $R2_1$ and, a negative spike waveform as shown at 60 through the load resistance $R1_1$. The generation of the square waveform and spike waveform may be understood by reference to formula (6) above. Voltage source 56 is assumed to be a constant voltage source such as for example a battery. The AC source 53 is selected at a relatively high frequency such that the resulting sinusoidal capacitive changes occur more rapidly than voltage source 56 is able to respond by supplying the appropriate charge, i.e. the voltage source effectively supplies a maximum amount of current. For example, assume that $V_i$ is essentially a constant and fixed by the voltage source 56. As $V_e$ is varied say from 0 to its maximum value, the value of the capacitance likewise varies in the same sinusoidal fashion and reaches a maximum value for the particular $V_e$ selected. During this rapid rise in capacitance of the device 1 current from the source 56 will be delivered at a maximum rate to charge the inner electrodes 10 and 12. This maximum rate will be nearly a constant value resulting in a constant current waveform 58 across load $R2_1$. When the value of a capacitance decreases during the second quarter of the sinusoidal waveform there will be a point at which the capacitance of device 1 is below that required for the charges to be maintained on the inner electrodes 10 and 12 for the voltage $V_i$. At this time a reverse current pulse in the form shown at 60 is driven through load resistance $R1_1$. Load resistance $R1_1$ is chosen to have a large value such that the positive current (voltage) waveform 58 may be utilized to charge inner electrodes 10 and 12. The negative spike current pulse is, however, delivered through load resistance R1$_1$ and is prevented from reaching the voltage source 56 because of the diode 54.

It is thus seen that the circuit of FIG. 4 may be utilized to generate square waves and spike pulses which in turn may be passed through various loads and utilized for triggering or gating purposes and the like. More generally, the apparatus of FIG. 4 may be utilized as a wave shaper/generator.

As another example of the utilization of the capacitor as a wave shaper, one may apply a square current waveform to the outer electrodes 18 and 22. The constant rate of increase in charge thus applied to the external electrodes 18 and 22 results in a sawtooth waveform for the capacitance change which may be utilized to draw a sawtooth current in the internal circuit of inner electrodes 18 and 22. The duty cycles and particular rise and fall times of the generated waveforms may be controlled by means of variable controlling frequency, rise time and amplitudes of the voltages $V_i$ and $V_e$.

Figure 5:
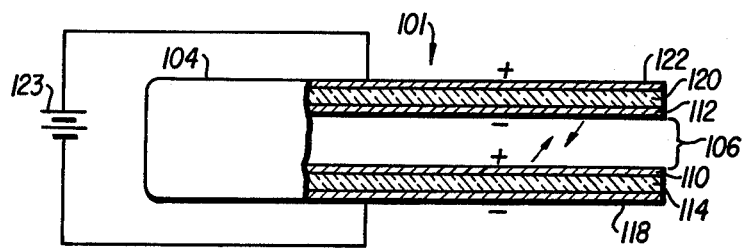

When utilized as a capacitor, the apparatus of the invention is connected such that the inner electrodes are applied to the external circuit and the external electrodes serve primarily a control function. This same arrangement holds when the device is used for a solar cell application. FIG. 5 is a simplified version of the device 101 illustrated in copending application Ser. No. 805,399. Within the housing generally indicated at 104 there is contained an electron emitting surface 110 (cathode) and an electron collecting surface 112 (anode). The emitting and collecting surfaces are spaced apart within a region 110 which may be a vacuum, a reduced pressure, gas-filled region or, generally, a region containing material wherein electrons have a high mobility. Typically, the electron emitting surface may comprise an alkali metal such as sodium or cesium silver oxide which may be vacuum deposited in relatively pure form upon a substrate. The substrate may also be utilized as a first dielectric means 114 to separate the emitting surface 110 from a first outer electrode 118. Alternately, of course, the electron emitting surface 110 may be deposited upon a separate substrate positioned between the first dielectric means 114 and the emitting surface 110.

Also shown in FIG. 5 is a second outer electrode 122 separated from the collecting surface 112 by a second dielectric means 120. Reference is made to the aforementioned copending application for additional details of the electrodes and dielectric means, the foregoing description being given to provide an understanding of the key elements of the device in the various embodiments described herein.

Electrons may be emitted from the electron emitting surface 110 using the photoelectric effect wherein light or, more generally, electromagnetic radiation strikes the surface 110 and liberates electrons therefrom. Alternatively, a thermal function may be employed whereby the electrons are emitted thermally by a current passing through the cathode material of the electron emitting surface 110 or by some other means wherein the surface 110 is heated to emit electrons. For example, heat energy liberated by absorbed e.m. (infrared) radiation may cause electron emission. During an initial charging cycle, a DC power source 123 is connected across electrodes 118 and 122, thus providing a negative charge on electrode 118 and a positive charge on electrode 122. By placing a negative charge on outer electrode 118 electrons emitted from emitting surface 110 will migrate towards the collecting surface 112 aided additionally by the positive charge on outer electrode 122. The electric field within region 106 produced by the outer electrodes 118 and 122 will be decreased as the electrons migrate from emitting surface 110 to collecting surface 112 inasmuch as a counter E field will be generated by the charges on surfaces 110 and 112. Since the resultant E field between outer electrodes 118 and 122 decreases, and the DC power source (for example, a battery) attempts to maintain a constant potential between electrodes 118 and 122, the power source supplies more charge on the outer electrodes 118 and 122. The outer electrodes 118 and 122 then having a greater charge thereon will tend to reestablish the initial electric field within region 106 so that the electrons emitted from emitting surface 110 will continue to charge collecting surface 112. If the charging process is not terminated, arc-over will occur between one of the outer electrodes and one of the surfaces 110 and 112 (interior electrodes), or between the emitting and collecting surfaces.

Stated in alternate terms, the device 101 has a source of constant potential connected to its outer electrodes 118 and 122 during charging of the device. The constant voltage source will tend to maintain a constant voltage across outer electrodes 118 and 122. The electric field between outer electrodes 118 and 122 will be partially canceled by a counter electric field set up by the accumulated charge on anode 112 and cathode 110 during exposure of the device to e.m. radiation. The voltage source, however, then supplies additional charge to the electrodes 118 and 122 to establish a larger charge per unit area, $\sigma = Q/A$, thus maintaining the potential V between electrodes 118 and 122. In this fashion, continued exposure of the device 101 to e.m. radiation results in a continual build-up of charge not only on anode surface 112 and cathode surface 110 but additionally on outer electrodes 118 and 122 via the voltage source 23.

In operation, the device will continue to accept more charge on the emitting and collecting surfaces and on the electrodes. If not discharged, the dielectric strength of the various dielectrics is overcome and arc-over occurs. However, before arc-over occurs the charges on the outer electrodes or the charges of the inner electrodes are removed. The order of removing the charge and the manner in which the charge is removed will depend upon the manner in which the device is to be employed.

With reference to the device of FIG. 5 used as a solar cell and as described in application Ser. No. 805,399, electrode 122, dielectric means 120, collecting surface 112 (anode) and the material within region 106 must be light transmissive (assuming light entering from the top). Thus, solar energy will strike the electron emitting surface 110 (photocathode) and cause the photoelectric effect to take place. Reflective surfaces that reflect light onto the photocathode may also be employed, or alternatively, the light may enter the side of the device or through the bottom as by way of a light transmissive electrode 118 and dielectric means 114. The interior of the unit will continue to build a charge as sunlight continues to strike the photocathode. There will, however, be a point at which no further electrons can be emitted from the photocathode and accepted by the anode, either because the dielectric materials break down (with possible damaging effects) or because no more emittable electrons are generated. Before this occurs, however, there may be provided a sensing means which senses the voltage between the anode 112 and electrode 122 or between photocathode 110 and electrode 118. The electrodes, cathode and anode can then be discharged in a manner such as described in application Ser. No. 805,399. When the unit functions as a solar cell, for example, the exterior electrodes are discharged first, followed by discharge of the inner electrodes (cathode and anode surfaces 110 and 112, respectively). The charge from the inner electrodes is used to drive a load.

FIG. 5A is another embodiment of the device as a solar energy converter and as a photovoltaic capacitor. Electrode 130 is a control electrode which may be in the form of a grid or screen and is positioned proximate electron emitter 110. The control electrode may be positioned on the surface of the electron emitter 110 or positioned therefrom by means not shown. Electrode 132 is positioned in the interior of the dielectric 114. Electrodes 130 and 132 are connected to a control circuit 135 which places a desired voltage on the electrodes 130 and 132 at desireable times in order to enhance or decrease the electron emission from electron emitter 110. The control circuitry 135 may comprise an AC or DC voltage controllable source.

Use of the device as a solar energy converter and as a capacitor has been discussed above. It will be appreciated that the device has further usages, such as a photoamplifier, a photomultiplier, a synchronizer, a switching device, a photodetector, a measuring apparatus for measuring electromagnetic radiation, an ion plasma device, a memory unit for converters and a test apparatus for producing photocathodes.

When the device is used as an ion plasma producer, a continuously negative charge is placed on cathode 110 and a positive charge on anode 112. As electrons are emitted from the cathode material, they are replaced by the negative source which is attached to cathode 110. As the electrons strike the anode 112, they are then compensated for by the positive source which is electrically connected to the collector.

It is possible to use the device to test photocathodes for either quantum efficiency or for their work function. In this same mode, it is possible to use the device as a photoamplifier. In the photodetecting mode, a device for measuring amperage or current flow is attached in the electrical circuit to anode 112 and/or photocathode 110. The measuring of the current fluctuations is then used in various ways.

In the ion plasma producing mode, a positive potential source is electrically connected to element 112, or a negative potential source is connected to element 110. If it is assumed that a negative source is connected to cathode 110, the electrons are emitted from the photocathode and are compensated for by the negative source. The electrons then diffuse throughout the interior region 106 of the housing. Should the region 106 have a slow diffusion rate or a desirable diffusion rate for electrons, electrons can be contained within the region 106, and the negative nature of these ions may be used in a device which would employ such a negative plasma.

As used as a synchronizer, a voltage detector or sensing means is placed between elements 112 and outer electrode 122 or element 110 and its corresponding outer electrode 118. With a constant light source having a constant spectral range illuminating the cathode 110, the amount of electrons produced during a certain period of measurable time will be constant. Therefore, for example, if the constant light source illuminates the photocathode for a nanosecond, then for each nanosecond a calculable amount of electrons can be produced. The sensing means will then sense the rise in the voltage, and as the voltage reaches a desirable peak, the device is caused to discharge. The circuitry employed for this purpose may be similar to that described in the above referenced copending application. Either the interior is discharged first, then the exterior, or vice versa. After the discharge, then the charge-up cycle begins again. The device in this mode can be used as a synchronizer for radar or a synchronizer or switching device for other devices which utilize means for measuring voltage change as the controlling element. The unit may then be used as a timer to transmit to the sensing means a signal to switch to another mode.

Another use of the device is as a memory unit for storing of a charge on the interior plate. As the interior plate stores the charge, the stored charge can be used as a measurement corresponding to data.

As a photocathode device, any electrically conductive or semiconductive material may be employed as the outer electrodes 118 and 122 and anode 112. The dielectrics 114 and 120 may also be of appropriate electrically resistive material. The medium forming region 106 is preferably a vacuum or gas which facilitates migration of electrons from the photocathode 110 to the anode 112. Also, a selenium membrane such as illustrated in U.S. Pat. No. 3,407,394 could be used. The photocathode 110 may be any low work fraction material which can be excited by a light source, such as Ag—O—Cs, Sb—Cs, alkali metal or earth, or other known materials. Reference is also made to U.S. Pat. No. 3,872,222 for additional photoemissive materials.

As discussed above, the cathode need not be a photocathode; it can be a thermal cathode, and the unit may still function as a capacitor, an amplifier, a synchronizer, a switching device, an electrical current measuring apparatus, an ion plasma producing device, a test method for testing photocathodes and as a memory unit. Further, where the term "photocathode" is used, it will be appreciated that other types of cathode material can be used depending upon the source of radiation. Also, where appropriate, a "thermal cathode" may be employed.

Figure 6:
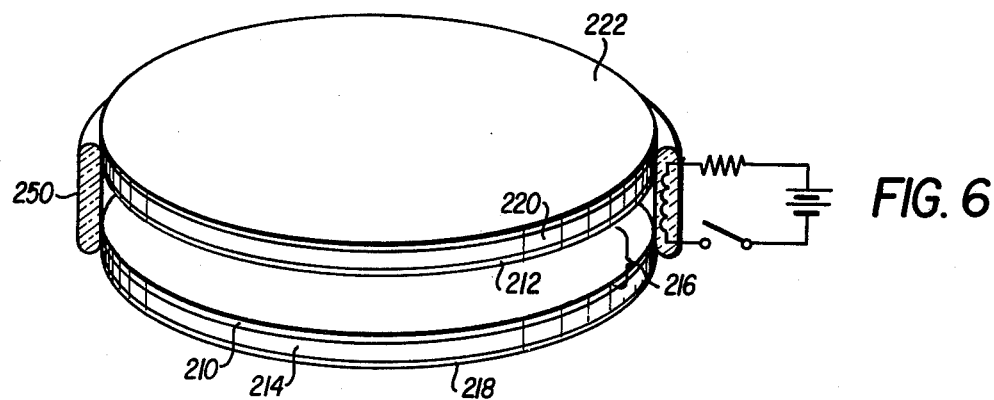
FIG. 6 is a perspective view of another embodiment of the invention.

While the embodiment in FIG. 5 and that in application Ser. No. 805,399 call for an exterior light or radiation source, it is possible as illustrated in FIG. 6 to have a light source incorporated with the device. Elements 218 and 222 are the outer electrodes, 212 is the anode, 216 is the dielectric space or region between the anode 212 and a photocathode 210. The dielectrics 214 and 220 are positioned in the same manner as described relative to FIG. 5. Additionally, the modification of FIG. 6 incorporates a light emissive device 250 surrounding the dielectric 216 and adjacent the photocathode 210. The light emissive device could be, for example, a vacuum encapsulated tungsten filament or a light emitting diode embedded in a lucite layer or similar device. The connecting leads and power source are also shown.

Figure 7:
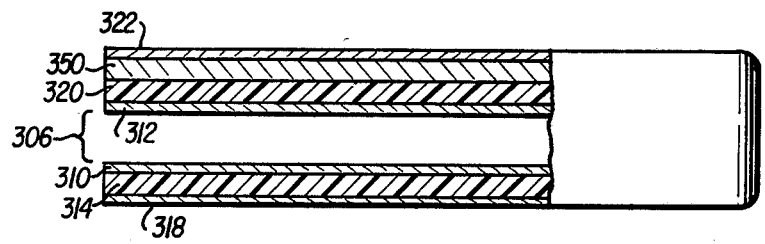
FIG. 7 is a schematic cross-sectional view of another embodiment of the invention.

Another modification is illustrated in FIG. 7 wherein the outer electrodes are 318 and 322, the collector or anode is 312, the dielectric space or region is 306 and the photocathode is 310. The dielectrics are 314 and 320; whereas, the light source is seen at 350 and is positioned between the dielectric 320 and the outer electrode 322. Obviously, the dielectric 320 and collector 312 are light transmissive.

Figure 8:
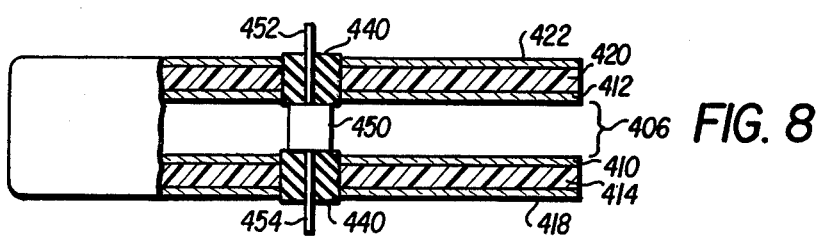
FIG. 8 is a schematic cross-sectional view of yet another embodiment of the invention.

FIG. 8 illustrates another embodiment wherein a plurality of planar elements include a pair of outer electrodes 418 and 422, an anode 412, a dielectric space 406, a photocathode 410 and a pair of dielectrics 414 and 420. An insulating support means 440 is centrally positioned within the device and houses a light emitting source 450. A pair of conductors 452 and 454 extend through the support means 440 for connection to a source of power for the light emitting source 450.

Figure 9:
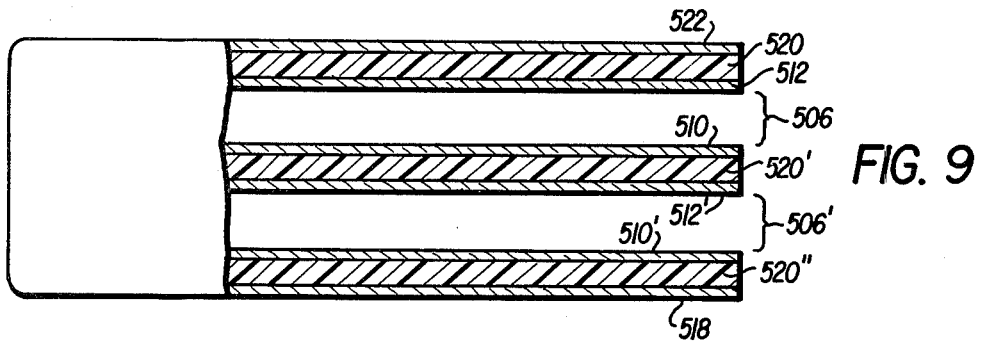
FIG. 9 is a schematic cross-sectional view of a further embodiment of the invention.

FIG. 9 illustrates an embodiment where a plurality of photocathodes and anodes are stacked and includes a pair of outer electrodes 518 and 522. A pair of collectors 512 and 512′ are seen positioned above dielectric spaces 506 and 506′ respectively, opposite photo or thermal cathodes 510 and 510′ respectively, with dielectrics 520, 520′ and 520″ respectively, positioned between the adjacent electrodes.

Figure 10:
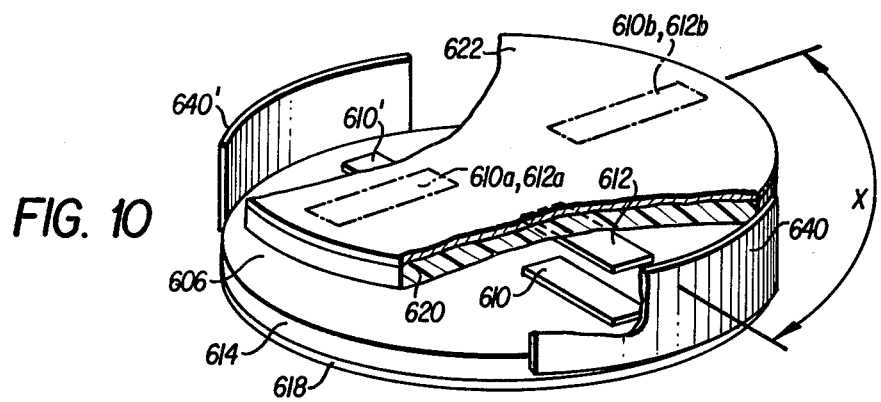
FIG. 10 is a perspective view, partially in section, of another embodiment of the invention.

FIG. 10 illustrates still another embodiment of the invention wherein a pair of outer electrodes 618 and 622 which are seen as being circular (the shape contemplated for the other modifications, as well) have sandwiched therein a pair of bar-shaped collectors 612, 612′ and photocathodes 610, 610′ with corresponding dielectrics 620 and 614 respectively positioned between the collectors and outer electrode 622 and cathodes and outer electrode 618. The dielectric region of material is seen as 606. (It is noted that collector 612′ is not shown in the drawing but is positioned directly above cathode 610′). This particular device has applicability when it is desired to have two circuits attached to the interior of the unit. One such circuit is attached to elements 610 and 612, and another circuit connected to 610′ and 612′. There is a further pair of exterior electrodes 640 and 640′. As electrodes 640 and 640′ are charged, an electrical field is set up by these electrodes, the field being perpendicular to the electric field generated between outer electrodes 618 and 622. Thus, the electrons which are emitted from the photocathode materials 610 and 610′ will be guided by the perpendicular electric field and strike collectors 612 or 612′, depending upon the manner in which they are guided by the electric field. For a field directing electrons to the right in the Figure, the circuit which incorporates elements 610 and 612 would have an increased electron current registered thereon due to the increase of electrons on collector 605; whereas, the circuit employing photocathode 610′ and collector 612′ would note a decrease of electrons. As a result, a device is provided wherein two separate circuits can be employed, and as one circuit has an increase in voltage or amperage, the other circuit has a proportional decrease in its voltage or amperage. Obviously, the number of pairs of cathodes and collectors need not be limited to two; one could use a number of photocathodes and anodes spaced at various angles from one another. Such a situation is illustrated by dotted electrodes 610a and 612a and 610b and 612b in FIG. 10.

It will be appreciated that a use of the device illustrated in FIG. 10 would be that of a switching unit or a measuring unit whereby the circuits employed would have a given power input, and as one circuit had more power placed on it, the other circuit would have less power placed thereon. The circuits would thus have power outputs inversely proportional to one another.

Figure 11:
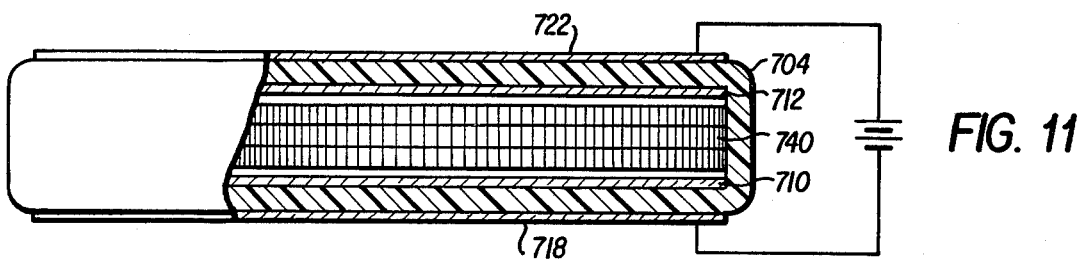
FIG. 11 is a schematic cross-sectional view of another embodiment of the invention.

Referring now to FIG. 11, another embodiment is illustrated wherein a pair of circular outer electrodes 718 and 722 are illustrated connected to a battery and positioned on a cylindrical housing 704 of dielectric material. A collector 712 is positioned under the top of the dielectric housing and secured therein; whereas, a photoemissive material 710 is positioned in the bottom of the housing adjacent the bottom dielectric wall. A grid system 740, similar to that seen in U.S. Pat. No. 2,438,587, in the form of a conductor is employed in such a manner as to reduce the wall charge of the electrons which may collect on the walls of the interior of the device, the grid 740 being on the inside of the housing.

Figures 12, 13:
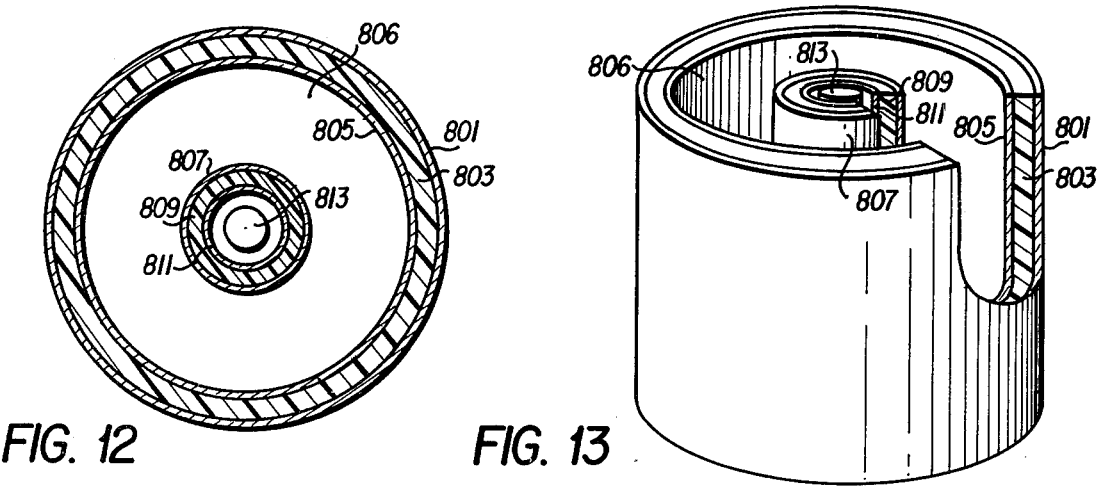
FIGS. 12 and 13 illustrate a top and perspective view of yet another embodiment of the invention.

A further modification is illustrated in FIGS. 12 and 13. In this cylindrical encapsulated modification, an outer electrode 801 in the form of a cylinder is positioned around a cylindrical dielectric housing 803 and includes an inner collector or anode element 805. A space or other dielectric 806 separates the anode 805 from a cylindrical photocathode 807. The photocathode is light transmissive as is a dielectric 809 which surrounds a light transmissive inner conductive electrode 811. In the center of the unit is a light source 813 (which may be of the type shown in FIG. 6) which shines through the electrode 811, the dielectric 809, and onto the photocathode material 807. The unit, as in the one in FIG. 10, can be evacuated so that a vacuum exists in the two cylindrical housings. Alternatively, other suitable dielectric material can be positioned in the interior of the housing.

When any of the above discussed modifications are used as a memory unit, there will be a continuing external E-field applied to the outer electrodes. As the external E-field drops, the internal electrodes will discharge, whereby the amount of the charge resulting from the discharge can be measured as an intelligent piece of data. The exterior charge must be kept on the outer electrodes until such time as the data is removed. In other words, the E-field of the outer electrodes is the electric field which causes the charge on the interior to be maintained. If the exterior charge is diminished or dissipated completely, the interior charges of the cathode and anode will also diminish or be discharged. Therefore, the memory unit is utilized in such a way wherein the intelligent piece of data remains on the interior until it is desired to be removed. To remove the data, the electric field created by the outer electrodes is decreased. Another possibility is by utilizing the outer electrodes as the intelligent piece of data in which case the interior electrodes will be discharged first in order to remove the data stored on the outer electrodes. This is the mode in the case with the photovoltaic capacitor.

It will be appreciated that semiconducting materials and materials with a P-N junction may be used as materials for the interior electrodes. Any electrically conductive surface can be utilized as the interior electrodes. Further, the device may or may not employ a vacuum, but need only facilitate an interior E-field opposite (or partially opposite) the externalized E-field.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. An electrical apparatus comprising:
   (a) a first electrode having major opposed surfaces;
   (b) a first dielectric having major opposed surfaces, one surface thereof positioned proximate one surface of said first dielectric;

(c) a second electrode having major opposed surfaces, one surface thereof positioned proximate the other surface of said first dielectric;

(d) a second dielectric positioned proximate the other surface of said second electrode;

(e) a third electrode having major opposed surfaces, one surface thereof positioned proximate said second dielectric and generally facing said other surface of said second electrode, said second dielectric thereby positioned in between said second and third electrodes;

(f) a third dielectric having major opposed surfaces, one surface thereof positioned proximate the other surface of said third electrode;

(g) a fourth electrode having major opposed surfaces, one surface thereof positioned proximate the other surface of said third dielectric;

(h) means connecting said first and fourth electrodes to a control circuit whereby an electrical potential is established between said first and fourth electrodes; and (i) means connecting said second and third electrodes to an external circuit whereby, upon operation of said external circuit, said second and third electrodes are connected in said external circuit.

2. An electrical apparatus as recited in claim 1 wherein said control circuit comprises a source of constant potential connected between said first and fourth electrodes.

3. An electrical apparatus as recited in claim 1 wherein said second electrode comprises an electron emitter and said third electrode comprises an electron collector.

4. An electrical apparatus as recited in claim 3 wherein said electron emitter emits electrons upon exposure to electromagnetic radiation and said apparatus comprises means for exposing said electron emitter to electromagnetic radiation.

5. An electrical apparatus as recited in claim 4 wherein said apparatus forms a solar cell, said electromagnetic radiation comprises solar radiation, and said external circuit comprises a load driven by said solar cell.

6. An electrical apparatus as recited in claim 5 wherein said control circuit comprises a variable potential source for cyclically charging and discharging said solar cell.

7. An electrical apparatus as recited in claim 4 wherein said apparatus further comprises means for generating said electromagnetic radiation.

8. An electrical apparatus as recited in claim 7 wherein said electromagnetic generating means comprises an electrically operated light emitting device.

9. An electrical apparatus as recited in claim 8 wherein said light emitting device is a light emitting diode.

10. An electrical apparatus as recited in claim 8 wherein said first, second, third and fourth electrodes and said first and third dielectrics are generally planar and positioned parallel to one another and said second dielectric comprises a gaseous medium, and wherein said apparatus further comprises means for positioning said light emitting device generally centrally of said first, second, third and fourth electrodes and within the region of said second dielectric.

11. An electrical apparatus as recited in claim 4 wherein said second dielectric means comprises a gas.

12. An electrical apparatus as recited in claim 4 wherein said second dielectric comprises a gaseous medium, said first and third dielectrics form top and bottom plates of a housing for housing said gaseous medium, said housing having side wall portions, and said apparatus further comprises a conductive grid surrounding said wall portions to reduce wall charge thereon.

13. An electrical apparatus as recited in claim 4 further comprising a grid control electrode means positioned proximate said electron emitter.

14. An electrical apparatus as recited in claim 13 wherein said grid control electrode means comprises a first control electrode positioned proximate one side of said electron emitter and a second control electrode positioned proximate the other side of said electron emitter.

15. An electrical apparatus as recited in claims 1 or 5, or 9, or 12, wherein said first, second, third and fourth electrodes are generally planar and parallel to one another.

16. An electrical apparatus as recited in claims 1 or 5, or 9, or 12, wherein said first, second, third and fourth electrodes and said first, second and third dielectrics are generally cylindrical and disposed concentrically with respect to one another.

17. An electrical apparatus as recited in claim 16 wherein said second dielectric comprises a gaseous medium forming a cylindrically disposed dielectric region.

18. An electrical apparatus as recited in claim 1 wherein said external circuit comprises an inductor and said second and third electrodes form a capacitance for use as a tuning element in connection with said inductor.

19. An electrical apparatus as recited in claim 1 wherein said control circuit comprises a variable potential source for cyclically varying the potential between said first and fourth electrodes.

20. An electrical apparatus as recited in claim 19 wherein said variable potential source comprises a sine wave generator.

21. An electrical apparatus as recited in claim 20 wherein said external circuit comprises a parallel circuit having two branches, a constant voltage source connected in one branch with said second and third electrodes and a resistive load connected in the other branch with said second and third electrodes.

22. An electrical apparatus as recited in claim 21 wherein said external circuit further comprises a diode connected in series with said constant voltage source in said one branch.

23. An electrical apparatus as recited in claim 1 further comprising:

(a) a fifth electrode having major opposed surfaces, (b) a fourth dielectric having major opposed surfaces, one surface thereof positioned proximate one surface of said fifth electrode, (c) a sixth electrode having major opposed surfaces, one surface thereof positioned proximate the other surface of said fourth dielectric, and (d) said fifth electrode, fourth dielectric and sixth electrode positioned between said second and third electrodes.

24. An electrical apparatus as recited in claim 23 wherein said first, second, third, fourth, fifth and sixth electrodes and said first, third and fourth dielectrics are generally planar and disposed parallel to one another, said second dielectric comprising a gaseous medium.

25. An electrical apparatus as recited in claim 1 wherein said first and fourth electrodes and said first and third dielectrics are generally planar and parallel to one another and said second electrode comprises an electron emitter and said third electrode comprises an electron collector, said apparatus further comprising:

(a) an additional electron emitter positioned within the same general plane of said electron emitter,
(b) an additional electron collector positioned within the same general plane of said electron emitter, and
(c) means for deflecting electrons from said electron emitter to said additional electron collector.

26. An electrical apparatus as recited in claim 25 wherein said deflection means comprises a pair of deflection electrodes.

* * * * *